United States Patent Office 3,087,933
Patented Apr. 30, 1963

3,087,933
NEW SULFONAMIDES
Max Matter, Muri, Roland Glatthard, Berne, Max Kuhn, Basel, and Karl Michel, Gumligen, Switzerland, assignors to HACO A.G., Gumligen, Switzerland, a Swiss company
No Drawing. Filed Jan. 19, 1961, Ser. No. 83,616
Claims priority, application Switzerland Jan. 22, 1960
6 Claims. (Cl. 260—310)

The present invention relates to new sulfonamides of the formula

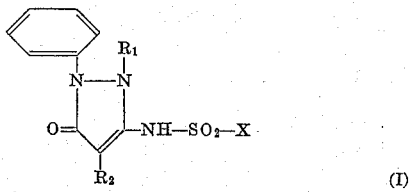

(I)

or to a tautomeric form thereof, wherein $R_1$ is a lower alkyl, phenyl or benzyl radical, $R_2$ is hydrogen, a lower alkyl, cycloalkyl, phenyl or benzyl radical and X is a lower alkyl, phenyl, tolyl or benzyl radical. The present invention further relates to salts of the new sulfonamides.

The sulfonamides according to the present invention have distinct acidic properties. They are capable of forming salts with organic bases such as lower aliphatic amines or with inorganic bases such as NaOH or KOH. When salts are formed with alkalis, such as sodium hydroxide or potassium hydroxide, or with lower aliphatic amines such as dimethylamine, diethylaminoethanol or diethanolamine, generally water-soluble compounds are obtained.

The new sulfonamides according to the invention and the salts thereof possess valuable pharmacological properties and may be used in both human and veterinary medicine, whereby their analgesic and antiphlogistic effect should be particularly mentioned, by means of which those illnesses can be controlled which are accompanied by inflammation such as rheumatic diseases and thrombophlebitis. Experiments have shown that the nature of the pharmacological effect of the new sulfonamides according to the present invention is similar to that of phenyl butazone. The following experiment shows the superior pharmacological properties of 1-phenyl-2:4-dimethyl-3-benzene-sulfonamido-3-pyrazolin-5-one in comparison with known phenyl butazone.

EXPERIMENTS

|  | 1-Phenyl-2:4-dimethyl-3-benzene-sulfonamido-3-pyrazolin-5-one | Phenyl butazone |
|---|---|---|
| Initial antiphlogistic effect: |  |  |
| Subcutaneous dose [1] | 0.03 g./kg. | 0.015 g./kg. |
| Level of max. effect obtained | good | good. |
| Oral dose | 0.1 g./kg. | 0.05 g./kg. |
| Level of max. effect obtained | good | good. |
| Dosis letalis media acuta ($DL_{50}$): |  |  |
| guinea pigs, s.c. | 2.0 g./kg. | 0.1 g./kg. |
| guinea pigs, p.o. | 2.0 g./kg. | 0.15 g./kg. |
| Therapeutic range: |  |  |
| guinea pigs, s.c. | 66 | 6.6. |
| guinea pigs, p.o. | 20 | 3. |

[1] For method used, see Helv. Physiol. Acta 17, 329–337 (1959).

From the above experimental data clearly ensues that the therapeutic range, that is to say the quotient $$\frac{DL_{50}}{\text{effective antiphlogistic dose}}$$

of 1-phenyl-2:4-dimethyl-3-benzene-sulfonamido-3-pyrazolin-5-one is considerably greater than that of phenyl butazone. Experiments with other sulfonamides according to the present invention equally show that, compared with phenyl butazone, they have a considerably greater therapeutic range than the latter compound, so that the experimental results obtained unquestionably give proof of technical advance by means of the new compounds according to the present invention.

In the above Formula I $R_1$ may be, for instance, ethyl, propyl, isopropyl, n-butyl, isobutyl, amyl, isoamyl, n-hexyl, isohexyl, phenyl, hexyl and preferably methyl. The radical $R_2$ may be, for instance, ethyl, n-propyl, isobutyl, amyl, hexyl, cyclobutyl, cyclopentyl and preferably hydrogen, methyl, n-butyl, isopropyl, cyclohexyl, phenyl and benzyl. The radical X may be, for instance, ethyl, propyl, isopropyl, n-butyl, isobutyl, amyl, isoamyl, hexyl, isohexyl, benzyl and preferably methyl, phenyl and tolyl.

It is a further object of the present invention to prepare the new sulfonamides of the above Formula I by condensing a 3-amino-3-pyrazolin-5-one of the formula

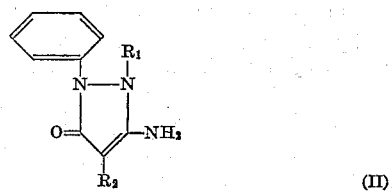

(II)

or one of the tautomeric forms thereof, wherein $R_1$ and $R_2$ have the above meanings, with a sulfonic acid halide of the formula halogen—$SO_2$—X wherein X has the meaning given above, in the presence of an acid binding agent and preferably at an increased temperature, and then, in such cases where two sulfonyl radicals have been introduced, removing one of these two sulfonyl radicals by hydrolysis.

The 3-amino-3-pyrazolin-5-ones can react in different ways because of their tautomeric behaviour, namely as follows:

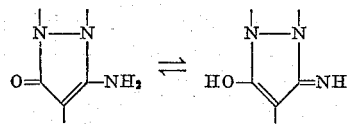

When condensing one mole of a 3-amino-3-pyrazolin-5-one with 2 moles of a sulfonic chloride, the following two types of reaction products can be obtained:

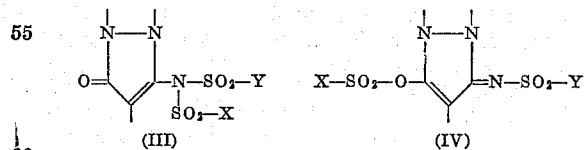

wherein X has the meaning given above.

The exact reaction mechanism has, however, not yet been ascertained, so that it is possible that, by means of the above mentioned condensation, a compound of Formula III or Formula IV, or also a mixture of these two types of compounds results. Nevertheless, it may be assumed with certainty that one of the two sulfonyl radicals is split off by hydrolysis, whereby a compound of the above Formula I is obtained.

The sulfonamides according to the present invention and the salts thereof may also be present in two tautomeric forms, the following two structural formulae being possible:

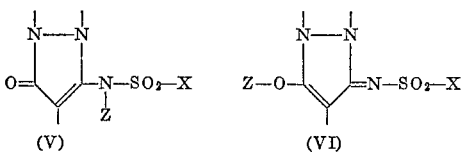

(V)     (VI)

The radicals Z in the above Formulae V and VI may be hydrogen or a cation such as sodium, potassium, etc. It is also possible that the new sulfonamides according to the invention and the salts thereof be present in a mesomeric condition. For purposes of simplicity the former of the two tautomeric forms above will, however, be used in the present specification, without the intention of thereby restricting the subject matter of the present invention to this tautomeric form alone.

For the condensation of the said 3-amino-3-pyrazolin-5-ones with sulfonic acid halides organic amines which are not capable of acylation can be used as acid binding agents. For this purpose trimethylamine, N:N:N':N'-tetramethyl-1:6-hexane diamine and pyridine are particularly suitable.

Still a further object of the present invention is a modified process for the preparation of the new sulfonamides, according to which a 3-pyrazolin-5-one of the formula

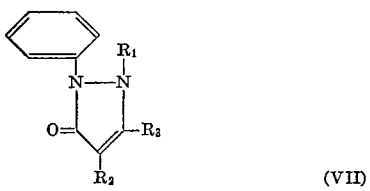

(VII)

wherein $R_1$ and $R_2$ have the meanings given above and $R_3$ means a halogen atom, such as chlorine or bromine, or an alkoxy, aryloxy, aralkoxy or trialkyl ammonium radical, is condensed, preferably at an elevated temperature, with an alkaline salt of a sulfonamide of the formula $$H_2N-SO_2-X$$

wherein X has the meaning given above.

As alkoxy radicals in this embodiment the methoxy or ethoxy radical, for instance, come in question, whereas as aryloxy radical the phenoxy radical and as aralkoxy radical the benzyloxy radical may, for instance, be employed. As trialkyl ammonium radical the trimethyl ammonium radical is preferred.

The said condensation of a 3-pyrazolin-5-one of the above Formula VII with an alkaline salt of a sulfonamide is advantageously performed in a solvent, so that both reaction components are at least partially dissolved during reaction. As solvent for this condensation carboxylic acid amides are particularly suitable, such as acetamide and dimethyl malonic acid diamide. Other polar solvents may, however, also be used for the condensation, such as dimethyl formamide, ethylene glycol monomethyl ether, diethylene glycol monoethyl ether and 1:2-propylene glycol. Generally, better yields are obtained by condensing a 3-pyrazolin-5-one of Formula VII with the potassium salt of the sulfonamide than by the use of the sodium or lithium salt respectively. As the new sulfonamides according to the invention are considerably more acid than the sulfonamides used as starting materials, it is advantageous to use 2 moles of an alkaline salt of a sulfonamide of the formula $H_2N-SO_2-X$ per mole of 3-halogen-3-pyrazolin-5-one of Formula VII.

The starting materials used for the preparation of the sulfonamides according to the invention are known compounds or may be prepared by methods known in themselves. Thus 3-amino-3-pyrazolin-5-ones are disclosed in Helvetica Chimica Acta, 33, 1183 (1950), and in Journal of the Chemical Society, London, 1960, 1989. Amino derivatives of a similar nature can also be prepared from the corresponding 3-halogen-3-pyrazolin-5-ones by heating these latter compounds together with aqueous alcoholic ammonia in the presence of a cuprous salt in a pressure vessel for several hours to 200–230° C. 3-halogen-3-pyrazolin-5-ones are disclosed in "Berichten der deutschen chemischen Gesellschaft" (Reports of the German Chemical Society) 46, 3604 (1913), and in the following examples.

The invention also comprises those modifications of the process according to which one starts from compounds which are obtainable as intermediate products at any step of the present process and then carries out the remaining steps of the process, or if the starting materials are formed under the reaction conditions involved. For instance, a 1-phenyl-2:4-dialkyl-3-halogeno-3-pyrazolin-5-one and a sulfonamide can be heated to 200° C. in the presence of an excess of powdered potassium carbonate in propylene glycol, while constantly evaporizing the water formed during the reaction. By this method the corresponding potassium salt is formed by the reaction of the sulfonamide with the potassium carbonate, the resulting potassium salt reacting subsequently with the halogen compound.

According to the procedure used for the preparation of the new compounds the same are either obtained in the form of the free sulfonamides or of salts thereof. The free sulfonamides may be prepared from the sulfonamide salts by known means; on the other hand, the free sulfonamides may be converted into the salts thereof by conventional methods. For the formation of salts to be used for therapeutic purposes inorganic bases, such as sodium hydroxide, sodium carbonate, ammonia, potassium hydroxide, calcium hydroxide, or organic bases such as diethylamine, triethanolamine, ethylene diamine, or therapeutically active bases such as tetraethyl ammonium hydroxide, are especially suitable.

The new compounds may be used as medicines, for instance in the form of pharmaceutical compositions containing the sulfonamides according to the invention or salts thereof in admixture with pharmaceutical, organic or inorganic carriers, diluents or solvents which are suitable for enteric, parenteral or topical application. As carrier or diluent may be used materials such as water, gelatine, lactose, starch, magnesium stearate, talcum, vegetable oils, benzyl alcohols, gum, polyalkylene glycols, petrolatum, cholesterol or other known medicinal carriers. The pharmaceutical compositions may, for instance, be in the form of tablets, dragees, ointments, crèmes or in liquid form as solutions, suspensions or emulsions. They can be sterilized and/or can contain auxiliary materials such as stabilizers, emulsifiers, wetting agents, salts for modifying the osmotic pressure, buffers or the like. They may indeed, still contain additional therapeutically valuable products, such as local anesthetics. The preparation of such pharmaceutical compositions can be effected by conventional methods.

The present invention is illustrated, but not limited by the following examples; the temperatures are given in Celsius.

*Example 1*

3.9 g. of 1-phenyl-2-methyl-3-amino-3-pyrazolin-5-one are dissolved in 350 ml. of boiling, absolute acetone. Then 7.8 g. of benezene sulphonic acid chloride and subsequently, within 10 to 15 minutes, 3.8 g. of N:N:N':N'-tetramethyl-1:6-hexane diamine dissolved in 40 ml. of absolute acetone are added to the resultant solution. After heating for 1½ hours under reflux the solution is cooled, the resulting precipitate is filtered off and washed with acetone. The filtrate is evaporated on the waterbath to dryness.

The resulting residue consists of a pyrazolone derivative in which two hydrogen atoms are replaced each by a benzene sulfonyl radical. To split off one of the said benzene sulfonyl radicals the reaction product is dissolved in 20 ml. of methanol, 50 ml. of water and 10 ml. of a 10-N sodium hydroxide solution, whereupon the methanol is distilled off by slowly heating on the water-bath. The small amount of insoluble matter is filtered off and to the filtrate an excess of acetic acid is added. The resultant, colorless precipitate is filtered by suction, washed with water and recrystallized from the methanol. In this manner 4.5 g. of 1-phenyl-2-methyl-3-benzene-sulfonamido-3-pyrazolin-5-one is obtained in the form of colorless crystals, melting at 222–224°, which are soluble in the equivalent quantity of a 0.3-N sodium hydroxide solution.

In a similar manner 1-phenyl-2-methyl-3-benzene-sulfonamido-4-isopropyl-3-pyrazolin-5-one is obtained from 1-phenyl-2-methyl-3-amino-4-isopropyl-3 - pyrazolin - 5 - one (obtainable according to Helvetica Chimica Acta, 33, 1192 (1950)) and benzene sulphonic acid chloride.

Example 2

According to the process described in Example 1, there is obtained from 6.1 g. of 1-phenyl-2:4-dimethyl-3-amino-3-pyrazolin-5-one (obtainable according to British Patent No. 563,279), 12.4 g. of benzene sulfonic acid chloride and 6.9 g. of N:N:N':N'-tetramethyl-1:6-hexane diamine, 8.7 g. of 1-phenyl-2:4-dimethyl-3-benzene-sulfonamido-3-pyrazolin-5-one in the form of colorless crystals melting at 261–263° (dec.).

Instead of N:N:N':N'-tetramethyl-1:6-hexane diamine, trimethylamine can also be used as acid binding agent. In this case a pressure vessel will preferably be used for the reaction.

Example 3

3.05 g. of 1-phenyl-2:4-dimethyl-3-amino-3-pyrazolin-5-one are dissolved in 110 ml. of boiling acetone and to the resulting solution is added 6.9 g. of p-toluene sulfonic acid chloride, dissolved in 10 ml. of acetone. 8.6 g. of N:N:N':N'-tetramethyl-1:6-hexane diamine in 30 ml. of of acetone are then added dropwise to the reaction mixture. After boiling the reaction mixture under reflux for 3 hours, the white precipitate is filtered off and washed with acetone. The filtrate is evaporated on the water-bath to dryness. The dry residue is dissolved with 150 ml. of methanol and 50 ml. of water. Then the major amount of the so-obtained solution is distilled off under normal pressure, until about 30 ml. of solution remain. The resulting solution is acidified with glacial acetic acid, left to crystallize at 0° and filtered off. The crystals remaining on the filter are washed with cold methanol and then recrystallized from a large volume of methanol in the presence of animal charcoal. In this manner 3.2 g. of pure 1-phenyl-2:4-dimethyl-3-(p-toluene sulfonamido)-3-pyrazolin-5-one are obtained in the form of colorless crystals melting at 252–254°.

Example 4

3 g. of 1-phenyl-2-benzyl-3-chloro-4-methyl-3-pyrazolin-5-one, 3.5 g. of potassium salt of n-butane sulfonamide and 50 ml. of tertiary butanol are heated for 7 hours at 170–175° in a pressure vessel under exclusion of oxygen, at a nitrogen pressure of 50 atmospheres. The major quantity of solvent is removed in vacuo and suspended in 200 ml. of water, 10 ml. of 1 N-sodium hydroxide solution and ether. The aqueous phase is rendered acid by means of a mineral acid and the brown oil which separates is then allowed to crystallize by letting it stand in a cold place. It is then filtered off, washed with water and crystallized from ethanol. By this process there is obtained 1-phenyl-2-benzyl-3-butane-sulfonamido-4-methyl-3-pyrazolin-5-one in the form of colorless crystals melting at 183–184°.

The starting material may be obtained as follows:

6.3 g. of 1-phenyl-3-chloro-4-methyl-2-pyrazolin-5-one (cf. Example 6) and 7.4 g. of benzene sulfonic acid benzyl ester are heated for 2 hours at 110° and then at 90° for 14 hours. The almost colorless melt is suspended in a 1 N-sodium hydroxide solution and ether. The ethereal solution is first washed with a saturated sodium hydrogen carbonate solution and then evaporated. The colorless residue crystallizes when rubbing with ether. After recrystallization from a mixture containing acetic acid ester and petroleum ether (ratio 1:2) there is obtained pure 1-phenyl-2-benzyl-3-chloro-4-methyl-3-pyrazolin-5-one in the form of colorless crystals melting at 94°.

Example 5

2.5 g. of 1:2-diphenyl-3-amino-3-pyrazolin-5-one are boiled under reflux in 160 ml. of absolute acetone. 4.2 g. of tosyl chloride are then added. During the course of 10 minutes a mixture of 1.9 g. of N:N:N':N'-tetramethyl-1:6-hexane diamine and 10 ml. of acetone are then added to the clear solution. After 1½ hours the precipitation of a colorless, crystalline precipitate commences. After boiling for 6 hours under reflux the precipitate is filtered off and the filtrate is evaporated under reduced pressure. The residue is heated with 10 ml. of methanol, 25 ml. of water and 5 ml. of 10-N sodium hydroxide solution on the water-bath and the methanol is very slowly allowed to distill off. After removing the methanol the solution is heated for a further 1½ hours on the water-bath. A brown oil is separated, which solidifies when cooled. It is filtered, washed with a small amount of 1-N sodium hydroxide solution and the filtrate is dissolved with an excess of hydrochloric acid. The precipitate thus obtained is filtered off by suction and washed with water. By recrystallization from methanol there is obtained 1:2-diphenyl-3-tosylamino-3-pyrazolin-5-one in the form of colorless crystals melting at 242–244°.

Example 6

17.6 g. of 1-phenyl-2:4-dimethyl-3-chloro-3-pyrazolin-5-one, 34.4 g. of potassium salt of benzene sulfonamide and 48 g. of acetamide are introduced into a flask provided with a reflux cooler and, after having replaced the air by nitrogen, the flask is heated, under exclusion of moisture, in an oil bath to 220–225° for two hours. After cooling, the reaction mixture is suspended in 100 ml. of 2-N sodium hydroxide solution and shaken with 100 ml. of ether. The aqueous layer is again washed with fresh ether and the ethereal layers are shaken with 100 ml. of 1-N sodium hydroxide solution and 50 ml. of water. The combined aqueous solutions are cooled to —5° and acidified with hydrochloric acid to a pH of 3. The colorless precipitate is filtered off, washed neutral with water and dried at 100° in vacuo. 23 g. of colorless crystals are obtained comprising raw 1-phenyl-2:4-dimethyl-3-benzene-sulfonamido-3-pyrazolin-5-one. By recrystallization from methanol the said compound is obtained in a pure form melting at 260–262°.

For oral application in medicine the 1-phenyl-2:4-dimethyl-3-benzene-sulfonamido-3-pyrazolin-5-one obtained according to the above example can be used directly in this form, for instance by filling it in gelatine capsules. For injection purposes a 20% aqueous solution of 1-phenyl - 2:4 - dimethyl-3-benzene-sulfonamido-3-pyrazolin-5-one can be prepared by adding the necessary amount of water and 1.05 moles of diethanolamine per mole of the said compound.

The 1-phenyl-2:4-dimethyl-3-chloro-3-pyrazolin-5-one, used as starting material in the above example, can be obtained in the following manner:

190 g. of 1-phenyl-4-methyl-3:5-pyrazolidin-dione, 91.4 ml. of phosphoroxychloride and 200 ml. of absolute chloroform are heated at 100° for 16 hours in an enamel autoclave provided with stirring means. After cooling, the reaction mixture is distributed between ice water and chloroform by vigorous stirring, sufficient ice being added to avoid the temperature from rising above 5°. The reaction mixture is treated with concentrated ammonia until the pH value reaches 10–11. The aqueous layer is separated, filtered and acidified with hydrochloric acid. The reaction mixture is then kept at 0° for two hours and subsequently the lumpy precipitate is filtered off by suction and washed neutral. In this manner colorless, moist crystals are obtained which, after recrystallisation from methanol while being cooled to −16°, yield 117 g. of pure 1-phenyl-3-chloro-4-methyl-2-pyrazolin-5-one having a melting point of 146–147°.

136.7 g. of the 1-phenyl-3-chloro-4-methyl-2-pyrazolin-5-one so obtained are heated for 10 hours at 100–110° with 126 g. of dimethyl sulfate in a flask provided with a reflux cooler and an $N_2$-atmosphere. The reaction mixture is then stirred with 1.5 liters water and rendered alkaline with concentrated caustic soda lye. The insoluble crystals are filtered off by suction, washed with water and dried in vacuo. By recrystallization from benzine 107 g. of pure 1-phenyl-2:4-dimethyl-3-chloro-3-pyrazolin-5-one melting at 87–88° are obtained.

Example 7

When working in exactly the same manner as described in Example 6, there are obtained from 3.3 g. of 1-phenyl-2:4-dimethyl-3-chloro-3-pyrazolin-5-one, 4.4 g. of potassium salt of methane sulfonamide and 6.6 g. of acetamide, 1.7 g. of 1-phenyl-2:4-dimethyl-3-methane-sulfonamido-3-pyrazolin-5-one. After recrystallization of this product from acetic acid ester colorless crystals melting at 173° are obtained.

The same compound is also obtained by boiling under reflux for 5 hours in an $N_2$-atmosphere, 7.5 g. of 1-phenyl-2:4-dimethyl-3-chloro-3-pyrazolin-5-one with 15.6 g. of potassium salt of methane sulfonamide in 50 ml. of absolute dimethyl formamide.

Example 8

When repeating the methods disclosed in Example 7, but using 1 mole of 1-phenyl-2:4-dimethyl-3-chloro-3-pyrazolin-5-one and 2.2 moles of an alkaline salt of butane sulfonamide, there is obtained 1-phenyl-2:4-dimethyl-3-butane sulfonamido-3-pyrazolin-5-one which, after recrystallization from acetic acid ester, is obtained in the form of colorless crystals which melt at 159°.

Example 9

When repeating the method described in Example 6, but using 7.9 g. of 1-phenyl-2-methyl-3-chloro-4-n-butyl-3-pyrazolin-5-one, 8.8 g. of potassium salt of methane sulfonamide and 16 g. of acetamide, 6 g. of raw 1-phenyl-2 - methyl-3-methane-sulfonamido-4-n-butyl-3-pyrazolin-5-one are obtained. After recrystallization from acetic acid ester the pure compound melts at 167°.

The 1-phenyl-2-methyl-3-chloro-4-n-butyl-3-pyrazolin-5-one, used as starting material in the above example, can be obtained in the following manner:

37.8 g. of 1-phenyl-4-n-butyl-3:5-pyrazolidin-dione, 15 ml. of phosphoroxychloride and 60 ml. of chloroform are heated for 18 hours at 95–100° in a pressure vessel. After addition of ice the reaction mixture is distributed between diluted ammonia and chloroform. Upon acidifying, a sticky, yellow precipitate is precipitated from the aqueous layer. The same is filtered off by suction, washed neutral and recrystallized from methanol in a moist condition. The colorless crystals so obtained melt at 113–115° and consist of 1-phenyl-3-chlorine-4-n-butyl-2-pyrazolin-5-one.

65.5 g. of the compound thus obtained is heated at 100–105° for 16 hours with 44.1 g. of dimethyl sulfate. The reaction mixture is then vigorously stirred in a mixture of water and chloroform and rendered alkaline with sodium hydroxide solution. The chloroform layer is precipitated, washed with a saturated sodium chloride solution and evaporated to dryness. After distillation of the resulting residue in high vacuo, at a temperature of 142–143° and a pressure of 0.01 mm., a yellowish oil consisting of 1-phenyl-2-methyl-3-chloro-4-n-butyl-3-pyrazolin-5-one is obtained; $n_{20}^D=1.5678$.

Example 10

When repeating the method described in Example 6, but using 10.6 g. of 1-phenyl-2-methyl-3-chloro-4-n-butyl-3-pyrazolin-5-one and 15.4 g. of potassium salt of butane sulfonamide in 25 g. of acetamide, 7 g. of 1-phenyl - 2 - methyl - 3 - butane - sulfonamido - 4 - n-butyl-3-pyrazolin-5-one is obtained. After recrystallization of the said compound from 50% methanol, colorless crystals melting at 120° are obtained. The melting point is not changed by a recrystallization from acetic acid ester.

Example 11

When repeating the methods mentioned in Example 7, but using 6.9 g. of 1-phenyl-2-methyl-3-chloro-4-n-butyl-3-pyrazolin-5-one and 10.5 g. of sodium salt of tosyl amide, 1-phenyl-2-methyl-3-tosylamido-4-n-butyl-3-pyrazolin-5-one is obtained. After recrystallization from benzene or methanol colorless crystals melting at 173° are obtained.

Example 12

When repeating the method described in Example 6, but using 2.84 g. of 1:4-diphenyl-2-methyl-3-chloro-3-pyrazolin-5-one and 3.85 g. of potassium salt of butane sulfonamide, 3.1 g. of 1:4-diphenyl-2-methyl-3-butane-sulfonamido-3-pyrazolin-5-one can be precipitated from water; M.P. 160°. After recrystallization from 12 ml. of ethanol 2.9 g. of the pure substance melting at 163° are obtained in the form of colorless crystals.

The 1:4-diphenyl-2-methyl-3-chloro-3-pyrazolin-5-one used as starting material in the above example can be obtained as follows:

19.4 g. of 1:4-diphenyl-3:5-pyrazolidin-dione, 7.3 ml. of phosphoroxychloride and 50 ml. of absolute chloroform are heated at 90° for 16 hours in a pressure vessel while being stirred. After cooling, the reaction product is treated with a 10% aqueous ammonia solution and chloroform. After acidifying with mineral acid, a brown oil is precipitated from the aqueous solution. The said oil is dissolved in hot methanol, whereby, upon cooling, colorless crystals are obtained which consist of pure 1:4-diphenyl-3-chloro-2-pyrazolin-5-one and have a melting point of 147°.

4.2 g. of the compound thus obtained are heated at 110° together with 1.6 ml. of dimethyl sulfate for 4 hours. The compound is treated with chloroform, shaken with a N-sodium hydroxide solution and then with a saturated sodium hydrogen carbonate solution, whereupon the chloroform solution is evaporated. After recrystallization of the resulting residue from ethanol 3.4 g. of pure 1:4-diphenyl-2-methyl-3-chloro-3-pyrazolin-5-one melting at 117° are obtained.

Example 13

2.9 g. of 1-phenyl-2-methyl-3-chloro-4-cyclohexyl-3-pyrazolin-5-one, 3.85 g. of potassium salt of butane sulfonamide and 6 g. of acetamide are reacted and treated according to the process described in Example 6. In this manner, 1.4 g. of 1-phenyl-2-methyl-3-butane-sulfonamido-4-cyclohexyl-3-pyrazolin-5-one are obtained which, after recrystallization from acetic acid ester and ethanol is precipitated in the form of colorless crystals having a melting point of 181°.

The above mentioned 1-phenyl-2-methyl-3-chloro-4-cyclohexyl-3-pyrazolin-5-one can be obtained in the following manner:

31.8 g. of 1-phenyl-4-cyclohexyl-3:5-pyrazolidin-dione, 75 ml. of absolute chloroform and 13 ml. of phosphoroxychloride are stirred at 85° in a pressure vessel for 15 hours. The mixture is diluted with 200 ml. of chloroform and poured into a mixture of 200 ml. of a 25% ammonia solution and crushed ice, so that the temperature never rises above 5°. After the addition of 1 liter of water, the mixture is shaken, the chloroform layer is separated and shaken with 500 ml. of a 2-N ammonia solution. The combined aqueous solutions are rendered acid by addition of mineral acid and the resultant oily precipitate is taken up in chloroform. The chloroform solution is washed with water and evaporated, whereby an oily residue is obtained. After recrystallization from methanol, colorless crystals are obtained from the said oily residue. The crystals have a melting point of 71–72° after having been dried at 50° in high vacuo and consist of 1-phenyl-3-chloro-4-cyclohexyl-2-pyrazolin-5-one, to which 1 molecule of methanol is linked.

11.1 g. of the compound thus obtained are heated at 110° for 4 hours together with 4.2 ml. of dimethyl sulfate. After working up the reaction mixture and after distillation in high vacuo at a temperature of 150–155° and a pressure of 0.01 mm. 11.0 g. of pure 1-phenyl-2-methyl-3-chloro-4-cyclohexyl-3-pyrazolin-5-one are obtained in the form of a colorless thick oil. For further purification this oil is treated with petroleum ether, filtered through an aluminum oxide column and concentrated. After cooling, colorless crystals are obtained having a melting point of 54°.

*Example 14*

When working in the manner described in Example 6, but using 2.9 g. of 1-phenyl-2-methyl-3-chloro-4-cyclohexyl-3-pyrazolin-5-one, 4.3 g. of potassium salt of benzene sulfonamide and 6 g. of acetamide, 1-phenyl-2-methyl - 3 - benzene - sulfonamido - 4 - cyclohexyl - 3-pyrazolin-5-one is obtained. After recrystallization from methanol colorless needles melting at 242° are obtained.

*Example 15*

4 g. of 1-phenyl-2-methyl-3-chloro-4-benzyl-3-pyrazolin-5-one, 4 g. of potassium salt of methane sulfonamide and 10 g. of acetamide are caused to react together and worked up in the way described in Example 6. In this manner 1-phenyl-2-methyl-3-methane-sulfonamido-4-benzyl-3-pyrazolin-5-one is obtained which, after recrystallization from methanol and acetic acid ester, precipitates in the form of colorless crystals which melt at 193°.

The 1-phenyl-2-methyl-3-chloro-4-benzyl-3-pyrazolin-5-one used in the above example can be obtained in the following manner:

96 g. of 1-phenyl-4-benzyl-3:5-pyrazolidin-dione, 36 ml. of phosphoroxychloride and 250 ml. of absolute chloroform are heated at 95–100° in a pressure vessel for 15 hours. The mixture is treated with ice and distributed between chloroform and a diluted ammonia solution. After treatment with an excess of mineral acid, a crystalline precipitate is obtained from the aqueous layer, which can be recrystallized from 80% methanol after having been dried in vacuo. The 1-phenyl-3-chloro-4-benzyl-2-pyrazolin-5-one thus obtained melts at 119°.

10 g. of the compound thus obtained are heated at 110° together with 6.3 g. of dimethyl sulfate for 3 hours. After distributing between chloroform and a diluted sodium hydroxide solution and after evaporation of the chloroform a weak brown oil is obtained which can be distilled in high vacuo at a temperature of 190° and a pressure of 0.2 mm. Hg. In this way pure 1-phenyl-2-methyl-3-chloro-4-benzyl-3-pyrazolin - 5 - one is obtained. After letting it stand for a considerable length of time at room temperature this compound crystallizes out spontaneously; the colorless crystals have a melting point of 65°.

*Example 16*

4.0 g. of 1-phenyl-2-n-butyl-3-chloro-4-methyl-3-pyrazolin-5-one, 5.8 g. of potassium salt of butane sulfonamide and 8 g. of acetamide are heated at 220–225° for 5 hours under exclusion of moisture in a N₂-atmosphere. After the working up according to the method described in Example 6, 2.1 g. of 1-phenyl-2-n-butyl-3-n-butane-sulfonamido-4-methyl-3-pyrazolin-5-one are obtained in form of colorless crystals. After recrystallization from ethanol and methanol the crystals have a melting point of 158–159°.

The 1-phenyl-2-n-butyl-3-chloro-4-methyl-3-pyrazolin-5-one used as starting material can be prepared in the following manner:

10.5 g. of 1-phenyl-3-chloro-4-methyl-2-pyrazolin-5-one (cf. Example 6) and 10.7 g. of benzene sulfonic acid-n-butyl ester are heated at 120–130° for 16 hours. The reaction product is distributed between ether and a diluted solution of sodium hydroxide, and the ether subsequently removed by evaporation, whereby 11.5 g. of a yellow oil are obtained. After distilling in high vacuo at a temperature of 115° and a pressure of 0.01 mm. Hg and after recrystallization from petrol ether, the pure compound is obtained in the form of colorless crystals having a melting point of 44–46°.

*Example 17*

When proceeding according to the method described in Example 6, but using 3.4 g. of 1-phenyl-2-n-butyl-3-chloro-4-methyl-3-pyrazolin-5-one and 5.7 g. of potassium salt of benzene sulfonamide, 1-phenyl-2-n-butyl-3-benzene-sulfonamido-4-methyl-3-pyrazolin-5-one is obtained. When recrystallized from ethanol colorless crystals having a melting point of 188° will result.

*Example 18*

When working in the manner described in Example 6, but using 3.4 g. of 1-phenyl-2-n-butyl-3-chloro-4-benzyl-3-pyrazolin-5-one and 4.3 g. of potassium salt of benzene sulfonamide, 1-phenyl-2-n-butyl-3-benzene-sulfonamido-4-benzyl-3-pyrazolin-5-one is obtained. After recrystallization from methanol or acetic acid ester colorless crystals which melt at 196° are obtained.

The 1-phenyl-2-n-butyl-3-chloro-4-benzyl-3-pyrazolin-5-one, used as starting material, can be prepared as follows:

8 g. of 1-phenyl-3-chloro-4-benzyl-2-pyrazolin-5-one (cf. Example 15) and 6 g. of benzene sulfonic acid-n-butyl ester are heated at 130° for 14 hours under an N₂-atmosphere. Then water is added and the solution is rendered alkaline with a sodium hydroxide solution and treated with ether. Then the ether is removed by distillation and the residue is distilled in a high vacuo at a temperature of 180° C. and a pressure of 0.02 mm. Hg. In this way a weak reddish-brown oil is obtained, which consists of pure 1-phenyl-2-n-butyl-3-chloro-4-benzyl-3-pyrazolin-5-one.

*Example 19*

When repeating the method described in Example 6, but using 4.5 g. of 1-phenyl-2:4-dimethyl-3-chloro-3-pyrazolin-5-one and 9.2 g. of potassium salt of benzyl sulfonamide, 4.2 g. of a colorless compound are obtained. The same is then recrystallized from ethanol or methanol and dried in high vacuo at 80°. The 1-phenyl-2:4-dimethyl-3-benzyl-sulfonamido-3-pyrazolin-5-one thus obtained melts at 217°.

What we claim is:

1. A pharmaceutically acceptable sulfonamide of the formula

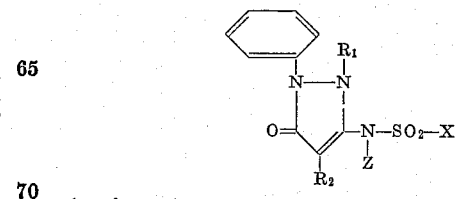

wherein $R_1$ is a member selected from the group consisting of lower alkyl, phenyl and benzyl; $R_2$ is a member selected from the group consisting of hydrogen, lower alkyl, cyclobutyl, cyclopentyl, cyclohexyl, phenyl and benzyl; X is a member selected from the group consisting of lower alkyl, phenyl, tolyl and benzyl; and Z is a member selected from the group consisting of hydrogen and a cation.
2. The sulfonamide of the formula
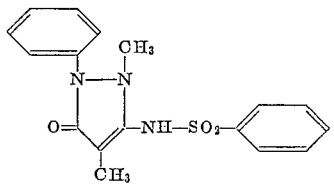
3. The sulfonamide of the formula
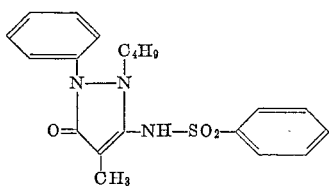
4. The sulfonamide of the formula
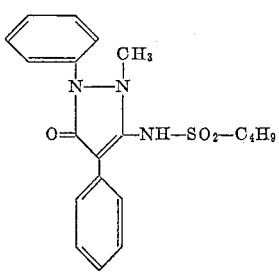
5. The sulfonamide of the formula
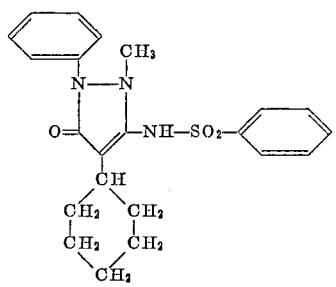
6. The sulfonamide of the formula
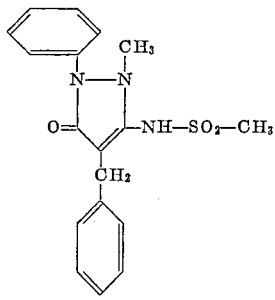
References Cited in the file of this patent
UNITED STATES PATENTS
2,710,871    Graham _____ June 14, 1955